US012615300B2

(12) United States Patent
Tian et al.

(10) Patent No.: US 12,615,300 B2
(45) Date of Patent: Apr. 28, 2026

(54) WebRTC COMMUNICATION METHOD AND SYSTEM

(71) Applicant: SHANGHAI BILIBILI TECHNOLOGY CO., LTD., Shanghai (CN)

(72) Inventors: Qiuran Tian, Shanghai (CN); Jianqiang Ding, Shanghai (CN); Guoshuai Bai, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/691,744

(22) PCT Filed: Jun. 14, 2022

(86) PCT No.: PCT/CN2022/098671
§ 371 (c)(1),
(2) Date: Mar. 13, 2024

(87) PCT Pub. No.: WO2023/040380
PCT Pub. Date: Mar. 23, 2023

(65) Prior Publication Data
US 2024/0406223 A1 Dec. 5, 2024

(30) Foreign Application Priority Data
Sep. 15, 2021 (CN) .......................... 202111079660.X

(51) Int. Cl.
*H04L 65/1069* (2022.01)
*H04L 65/1108* (2022.01)
(52) U.S. Cl.
CPC ...... *H04L 65/1069* (2013.01); *H04L 65/1108* (2022.05)

(58) Field of Classification Search
CPC ............. H04L 65/1069; H04L 65/1108; H04L 65/1066; H04L 65/1093; H04L 65/65; Y02D 30/70
See application file for complete search history.

(56) References Cited

U.S. PATENT DOCUMENTS

| 9,942,322 | B1 | 4/2018 | Reddy et al. | |
| 2016/0227161 | A1* | 8/2016 | Jing ..................... | H04L 65/1046 |
| 2023/0091539 | A1* | 3/2023 | Lan ..................... | H04L 12/1822 |
| | | | | 348/14.09 |

FOREIGN PATENT DOCUMENTS

| CN | 103581945 A | 2/2014 |
| CN | 103945003 A | 7/2014 |

(Continued)

OTHER PUBLICATIONS

International Patent Application No. PCT/CN2022/098671; Int'l Search Report; dated Sep. 16, 2022; 2 pages.

*Primary Examiner* — Farzana B Huq
(74) *Attorney, Agent, or Firm* — BakerHostetler

(57) ABSTRACT
The present application discloses a WebRTC communication method. The method includes acquiring first device information of a calling terminal device and second device information of a called terminal device; determining, based on the first device information and the second device information, whether there is nonessential information with respect to establishing a connection; and in response to determining that there is the nonessential information, establishing a WebRTC connection between the calling terminal device and the called terminal device with the nonessential information being excluded and implementing communications between the calling terminal device and the called terminal device. According to the technical solution disclosed in the present application, a network bandwidth and performance consumption of a signaling server can be (Continued)

reduced by over 30%, without affecting a success rate of establishing the WebRTC connection between the two terminal devices.

12 Claims, 4 Drawing Sheets

(56)                    References Cited

FOREIGN PATENT DOCUMENTS

| CN | 104012062 A | 8/2014 |
|----|-------------|--------|
| CN | 104255014 A | 12/2014 |
| CN | 104283760 A | 1/2015 |
| CN | 104869101 A | 8/2015 |
| CN | 106161179 A | 11/2016 |
| CN | 110113299 A | 8/2019 |
| CN | 113114702 A | 7/2021 |
| CN | 113630424 A | 11/2021 |
| WO | WO 2014/109487 A | 7/2014 |

* cited by examiner

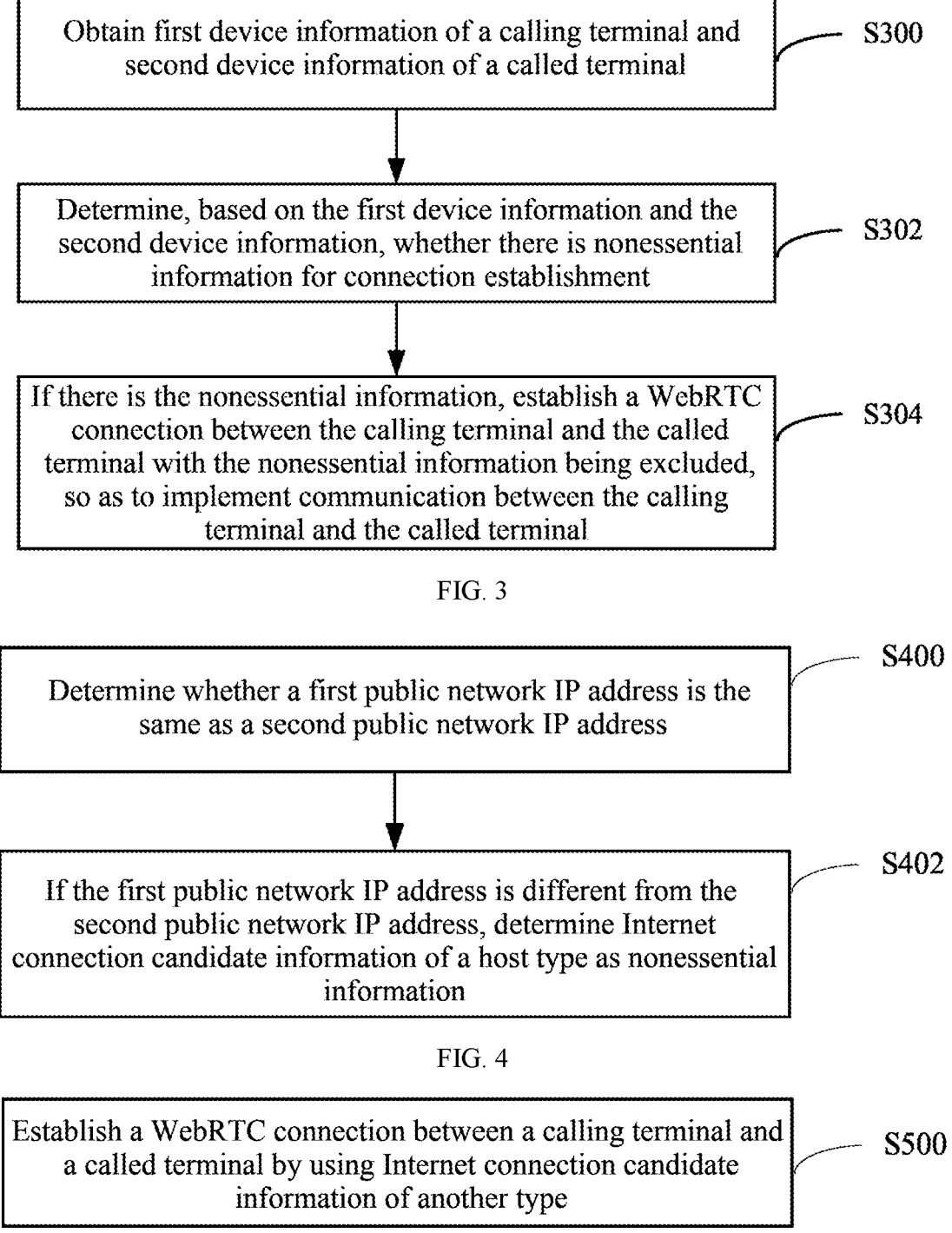

Obtain first device information of a calling terminal and second device information of a called terminal — S300

Determine, based on the first device information and the second device information, whether there is nonessential information for connection establishment — S302

If there is the nonessential information, establish a WebRTC connection between the calling terminal and the called terminal with the nonessential information being excluded, so as to implement communication between the calling terminal and the called terminal — S304

FIG. 3

Determine whether a first public network IP address is the same as a second public network IP address — S400

If the first public network IP address is different from the second public network IP address, determine Internet connection candidate information of a host type as nonessential information — S402

FIG. 4

Establish a WebRTC connection between a calling terminal and a called terminal by using Internet connection candidate information of another type — S500

FIG. 5

WebRTC COMMUNICATION METHOD AND SYSTEM

CROSS-REFERENCE TO RELATED APPLICATIONS

The present application is the U.S. National Stage of International Application No. PCT/CN2022/098671, filed on Jun. 14, 2022, which claims priority to Chinese Patent Application No. 202111079660.X, filed on Sep. 15, 2021, and entitled "WebRTC COMMUNICATION METHOD AND SYSTEM", which are incorporated herein by reference in their entireties.

TECHNICAL FIELD

The present application relates to the field of communication, and in particular, to a WebRTC communication method and apparatus, a computer device, a computer-readable storage medium, and a WebRTC communication system.

BACKGROUND ART

With the development of the world wide web (www) and mobile Internet, a WebRTC technology has become technical content of concern to all parties. Web real-time communication (WebRTC) is a technology for performing real-time video and audio communication inside a browser. For example, WebRTC may implement a web-based video conference. WebRTC makes direct web communication between browsers of different terminal devices possible, thereby changing a network structure mode in which the browser of the terminal device can only pull information through a server. This is a great change to a web technology.

The inventor has found that both parties that establish WebRTC communication forward all types of Internet connection candidate information to each other through a signaling server, resulting in an excessive network bandwidth and performance consumption of the signaling server.

SUMMARY OF THE INVENTION

An objective of embodiments of the present application is to provide a WebRTC communication method and apparatus, a computer device, a computer-readable storage medium, and a WebRTC communication system, to solve the following problem: Both parties that establish WebRTC communication forward all types of Internet connection candidate information to each other through a signaling server, resulting in an excessive network bandwidth and performance consumption of the signaling server.

An aspect of the embodiments of the present application provides a WebRTC communication method. The method includes:

obtaining first device information of a calling terminal device and second device information of a called terminal device;

determining, based on the first device information and the second device information, whether there is nonessential information for connection establishment; and if there is the nonessential information, establishing a WebRTC connection between the calling terminal device and the called terminal device with the nonessential information being excluded, so as to implement communication between the calling terminal device and the called terminal device.

Optionally, the first device information includes a first public network IP address of the calling terminal device, and the second device information includes a second public network IP address of the called terminal device.

The determining, based on the first device information and the second device information, whether there is nonessential information for connection establishment includes:

determining whether the first public network IP address is the same as the second public network IP address; and if the first public network IP address is different from the second public network IP address, determining Internet connection candidate information of a host type as the nonessential information.

Optionally, the Internet connection candidate information of the host type and Internet connection candidate information of another type form Internet connection candidate information. The establishing a WebRTC connection between the calling terminal device and the called terminal device with the nonessential information being excluded includes:

establishing the WebRTC connection between the calling terminal device and the called terminal device by using the Internet connection candidate information of the another type.

Optionally, the Internet connection candidate information of the host type and Internet connection candidate information of another type form Internet connection candidate information. The method further includes:

if the first public network IP address is the same as the second public network IP address, determining that there is not the nonessential information; and establishing the WebRTC connection between the calling terminal device and the called terminal device by using the Internet connection candidate information.

An aspect of the embodiments of the present application further provides a WebRTC communication apparatus. The apparatus includes:

an obtaining module configured to obtain first device information of a calling terminal device and second device information of a called terminal device;

a determining module configured to determine, based on the first device information and the second device information, whether there is nonessential information for connection establishment; and an establishment module configured to: if there is the nonessential information, establish a WebRTC connection between the calling terminal device and the called terminal device with the nonessential information being excluded, so as to implement communication between the calling terminal device and the called terminal device.

An aspect of the embodiments of the present application further provides a computer device, including a memory, a processor, and computer-readable instructions stored on the memory and capable of running on the processor. The processor executes the computer-readable instructions to implement the following steps:

obtaining first device information of a calling terminal device and second device information of a called terminal device;

determining, based on the first device information and the second device information, whether there is nonessential information for connection establishment; and if there is the nonessential information, establishing a WebRTC connection between the calling terminal device and the called terminal device with the nonessential information being excluded, so as to implement communication between the calling terminal device and the called terminal device.

An aspect of the embodiments of the present application further provides a computer-readable storage medium having computer-readable instructions stored thereon. The computer-readable instructions may be executed by at least one processor to cause the at least one processor to perform the following steps:

obtaining first device information of a calling terminal device and second device information of a called terminal device;

determining, based on the first device information and the second device information, whether there is nonessential information for connection establishment; and if there is the nonessential information, establishing a WebRTC connection between the calling terminal device and the called terminal device with the nonessential information being excluded, so as to implement communication between the calling terminal device and the called terminal device.

An aspect of the embodiments of the present application further provides a WebRTC communication system. The system includes a calling terminal device, a signaling server, and a called terminal device.

The calling terminal device is configured to obtain first device information of the calling terminal device and second device information of the called terminal device, determine, based on the first device information and the second device information, whether there is nonessential calling side information for connection establishment, collect first network information that does not include the nonessential calling side information if there is the nonessential calling side information, and forward the first network information to the called terminal device through the signaling server.

The called terminal device is configured to obtain the first device information and the second device information, determine, based on the first device information and the second device information, whether there is nonessential called side information for connection establishment, collect second network information that does not include the nonessential called side information if there is the nonessential called side information, and forward the second network information to the calling terminal device through the signaling server.

The signaling server is configured to forward the first network information and the second network information such that the first calling terminal device and the called terminal device establish a WebRTC connection and communicate based on the WebRTC connection.

Optionally, the first device information includes a first public network IP address of the calling terminal device, and the second device information includes a second public network IP address of the called terminal device.

The calling terminal device is further configured to determine whether the first public network IP address is the same as the second public network IP address, and if the first public network IP address is different from the second public network IP address, determine calling side Internet connection candidate information of a host type as the nonessential calling side information.

The called terminal device is further configured to determine whether the first public network IP address is the same as the second public network IP address, and if the first public network IP address is different from the second public network IP address, determine called side Internet connection candidate information of the host type as the nonessential called side information.

Optionally, the calling terminal device is further configured to send calling side Internet connection candidate information of a non-host type to the called terminal device through the signaling server.

The called terminal device is further configured to send called side Internet connection candidate information of the non-host type to the calling terminal device through the signaling server.

The WebRTC communication method and apparatus, the device, the computer-readable storage medium, and the WebRTC communication system provided in the embodiments of the present application have the following advantages.

The calling terminal device and the called terminal device need to exchange, by using the signaling server as an intermediate medium, information for establishing the WebRTC connection. In some scenarios, some connection manners are not suitable for the calling terminal device and the called terminal device, so that corresponding information may also be considered as nonessential information. Each time a WebRTC connection is established between terminal devices, if both parties ignore such nonessential information (that is, do not use the nonessential information for information exchange), a network bandwidth and performance consumption of the signaling server can be reduced by over 30%, without affecting a success rate of establishment of the WebRTC connection between the two terminal devices.

BRIEF DESCRIPTION OF THE DRAWINGS

FIG. 3 is a flowchart schematically showing a WebRTC communication method according to Embodiment 2 of the present application;

FIG. 4 is a flowchart of substeps of step S302 in FIG. 3;

FIG. 5 is a flowchart of a substep of step S304 in FIG. 3;

DETAILED DESCRIPTION OF EMBODIMENTS

Figure 1:
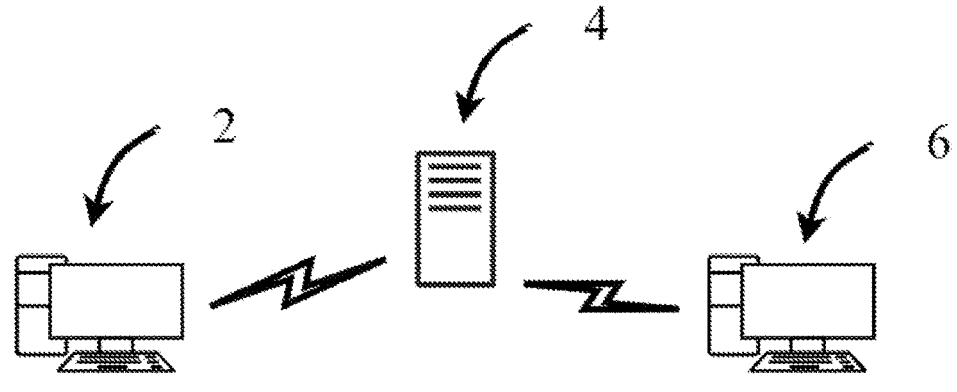
FIG. 1 is a diagram schematically showing a network architecture of a WebRTC communication system according to an embodiment of the present application.

To make the objectives, technical solutions, and advantages of the present application clearer and more comprehensible, the present application will be further described in detail with reference to the accompanying drawings and embodiments. It should be understood that the specific embodiments described herein are merely intended to explain the present application, and are not intended to limit the present application. All other embodiments obtained by those of ordinary skill in the art based on the embodiments of the present application without creative efforts shall fall within the protection scope of the present application.

It should be noted that the descriptions related to "first", "second", and the like in the embodiments of the present application are merely for the illustrative purpose, and should not be construed as indicating or implying the relative importance thereof or implicitly indicating the number of technical features indicated. Therefore, a feature defined by "first" or "second" may explicitly or implicitly include at least one such feature. In addition, technical solutions in various embodiments may be combined with each other, provided that they can be implemented by those of ordinary skill in the art. When a combination of the technical solutions incurs conflict or cannot be implemented, it should be considered that such a combination of the technical solutions does not exist, and does not fall within the claimed scope of protection of the present application either.

In the description of the present application, it should be understood that the reference numerals of steps do not indicate the order of execution of the steps, but are merely to facilitate the description of the present application and differentiation between the steps, and thus will not be interpreted as limiting the present application.

Web real-time communication (WebRTC) is a technology for performing real-time video and audio communication inside a browser. For example, WebRTC may implement a web-based video conference. WebRTC makes direct web communication between browsers of different terminal devices possible, thereby changing a network structure mode in which the browser of the terminal device can only pull information through a server. This is a great change to a web technology. The inventor has found that both parties that establish WebRTC communication forward all types of Internet connection candidate information to each other through a signaling server, resulting in an excessive network bandwidth and performance consumption of the signaling server.

For the foregoing problem, an objective of the present application is that: in a WebRTC establishment process, both parties avoid sending nonessential information as much as possible, for example, send only Internet connection candidate information of a part of types to the signaling server for the signaling server to forward to each other, so that a network bandwidth and performance consumption of the signaling server is effectively reduced.

Terms in the present application are explained below.

WebRTC: it is abbreviated from web real-time communication, and is a real-time communication technology. WebRTC allows network applications or sites to establish a peer-to-peer connection between browsers without an intermediate medium, to implement transmission of a video stream and/or an audio stream or any other data.

Signaling server: it is a server configured to forward messages between WebRTC clients.

RTCIceCandidate (Internet connection candidate information): it is a candidate Internet connectivity establishment (ICE) configuration for RTCPeerConnection establishment. An ICE candidate describes a protocol and routing that are required by communication with a called terminal device in WebRTC. When a WebRTC peer connection is initiated, a plurality of candidates are usually provided at each peer of the connection until the peers come to an agreement that the best candidate describes the connection determined by the peers. WebRTC uses detailed information about the candidate to initiate the connection.

These candidates are divided into a plurality of types that are listed in a priority order.

Host type: it corresponds to a host candidate, and an IP address specified in an RTCIceCandidate.ip attribute is actually a real address of a remote peer.

srflx type: it corresponds to a server reflexive candidate, and an IP represents an intermediate address allocated by a STUN server, and is used for anonymously representing a peer of the candidate.

prflx type: it corresponds to a peer reflexive candidate, and an IP represents an intermediate address allocated by the STUN server, and is used for anonymously representing a peer of the candidate.

relay type: it corresponds to a relay candidate obtained from a TURN server, and an IP address of the relay candidate is an address used by the TURN server to forward media between two peers.

Session description protocol (SDP): it is used for media negotiation between two session entities.

FIG. 1 is a diagram schematically showing a network architecture of a WebRTC communication system according to an embodiment of the present application.

A calling terminal device 2 may be configured as a device capable of implementing WebRTC communication. The calling terminal device 2 may include any type of computing device, for example, a mobile device, a tablet device, a laptop computer, or a smart television.

A signaling server 4 is a server configured to forward messages between WebRTC clients.

A called terminal device 6 may be configured as a device capable of implementing WebRTC communication. The called terminal device 6 may include any type of computing device, for example, a mobile device, a tablet device, a laptop computer, or a smart television.

The calling terminal device 2, the signaling server 4, and the called terminal device 6 may communicate with one another through one or more networks. The one or more networks include various network devices, for example, routers, switches, multiplexers, hubs, modems, network bridges, repeaters, firewalls, and/or proxy devices. The one or more networks may include physical links, for example, coaxial cable links, twisted-pair cable links, optical fiber links, and a combination thereof. The network may include a wireless link, for example, a cellular link, a satellite link, or a Wi-Fi link.

The calling terminal device 2 and the called terminal device 6 each are installed with a browser or a dedicated application program. WebRTC communication may be implemented between the calling terminal device and the called terminal device through the browsers or the dedicated application programs to further implement an audio call or a video call, or the like. The calling terminal device 2 and the called terminal device 6 each are configured with a client interface. The client interface may include an input element. For example, the input element may be configured to receive a user instruction. The user instruction may implement various types of operations.

In a process of establishing a WebRTC connection between the calling terminal device 2 and the called terminal device 6, the calling terminal device 2 and the called terminal device 6 need to exchange information with each other through the signaling server 4, so as to implement communication negotiation between the two. The information may include media information, network information (Internet connection candidate information), and the like.

Under the foregoing exemplary network architecture, the present application provides a plurality of embodiments for WebRTC communication, which is specifically as follows.

Embodiment 1

Continue to refer to FIG. 1. This embodiment provides a WebRTC communication system.

As shown in FIG. 1, the WebRTC communication system includes a calling terminal device 2, a signaling server 4, and a called terminal device 6.

The calling terminal device 2 is configured to obtain first device information of the calling terminal device and second device information of the called terminal device, determine, based on the first device information and the second device information, whether there is nonessential calling side information for connection establishment, collect first network information that does not include the nonessential calling side information if there is the nonessential calling side information, and forward the first network information to the called terminal device through the signaling server.

The called terminal device 6 is configured to obtain the first device information and the second device information, determine, based on the first device information and the second device information, whether there is nonessential called side information for connection establishment, collect second network information that does not include the nonessential called side information if there is the nonessential called side information, and forward the second network information to the calling terminal device through the signaling server.

The signaling server 4 is configured to forward the first network information and the second network information such that the first calling terminal device and the called terminal device establish a WebRTC connection and communicate based on the WebRTC connection.

The WebRTC communication system provided in this embodiment of the present application has the following advantages. The calling terminal device 2 and the called terminal device 6 need to exchange, by using the signaling server as an intermediate medium, information for establishing the WebRTC connection. In some scenarios, some connection manners are not suitable for the calling terminal device 2 and the called terminal device 6, so that corresponding information may also be considered as nonessential information. Each time a WebRTC connection is established between terminal devices, if both parties ignore such nonessential information (that is, do not use the nonessential information for information exchange), a network bandwidth and performance consumption of the signaling server can be reduced by over 30%, without affecting a success rate of establishment of the WebRTC connection between the two terminal devices.

In an exemplary embodiment, the first device information includes a first public network IP address of the calling terminal device, and the second device information includes a second public network IP address of the called terminal device. The calling terminal device 2 is further configured to determine whether the first public network IP address is the same as the second public network IP address, and if the first public network IP address is different from the second public network IP address, determine calling side Internet connection candidate information of a host type as the nonessential calling side information. The called terminal device 6 is further configured to determine whether the first public network IP address is the same as the second public network IP address, and if the first public network IP address is different from the second public network IP address, determine called side Internet connection candidate information of the host type as the nonessential called side information. In this embodiment, the calling side/called side Internet connection candidate information of the host type is determined as nonessential information, so that the network bandwidth and performance consumption of the signaling server 4 caused by sending by both parties can be effectively reduced.

In an exemplary embodiment, the calling terminal device 2 is further configured to send calling side Internet connection candidate information of a non-host type to the called terminal device through the signaling server. The called terminal device 6 is further configured to send called side Internet connection candidate information of the non-host type to the calling terminal device through the signaling server. In this embodiment, the calling side/called side Internet connection candidate information of the non-host type is used for WebRTC connection, so that the network bandwidth and performance consumption of the signaling server 4 caused by sending by both parties can be effectively reduced.

A WebRTC connection example based on the foregoing WebRTC communication system is provided below.

The calling terminal device 2 and the called terminal device 6 are registered with the signaling server 4.

The calling terminal device 2 may request a WebRTC connection with the called terminal device 6. A WebRTC connection process is as follows.

At operation 1, the calling terminal device 2 obtains a public network IP address of the calling terminal device and a public network IP address of the called terminal device 6 from the signaling server 4.

At operation 2, the calling terminal device 2 invokes a PeerConnection interface to create a PeerConnection object.

At operation 3, the calling terminal device 2 invokes a CreateOffer method of the PeerConnection object to create an offer SDP object. The offer SDP object may store a related parameter of the current audio/video.

At operation 4, the calling terminal device 2 sends the offer SDP object to the called terminal device 6 through the signaling server 4.

At operation 5, the called terminal device 6 receives the offer SDP object, invokes a CreateAnswer method of the PeerConnection object to create an answer SDP object, and sends the answer SDP object to the calling terminal device 2 through the signaling server 4.

Figure 2:
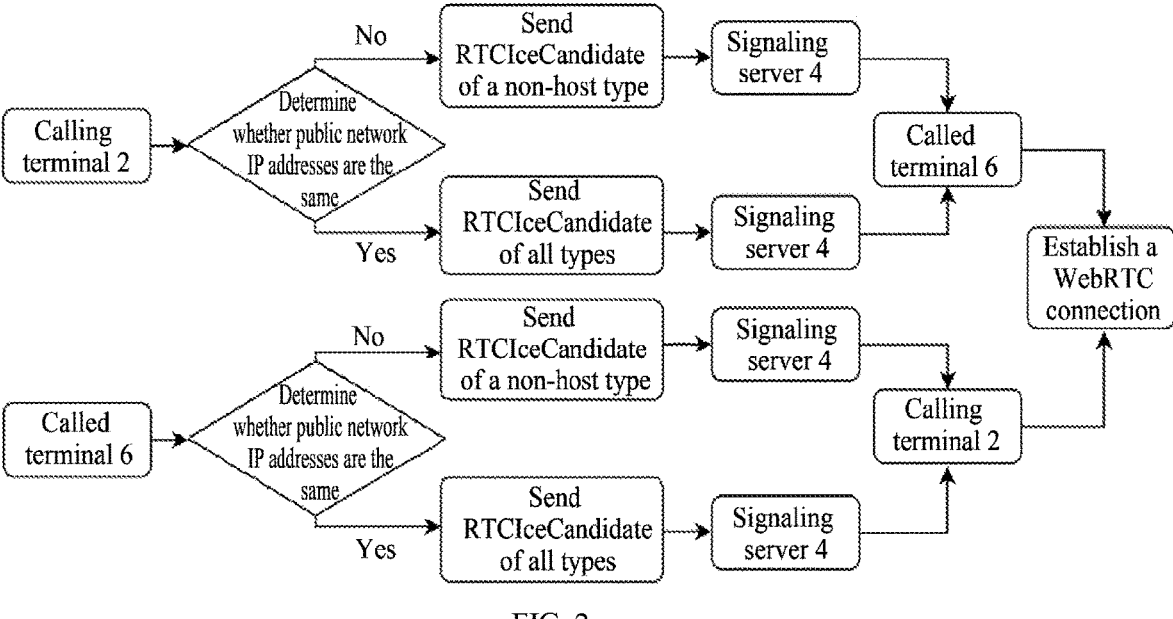
FIG. 2 schematically shows a WebRTC connection establishment process.

At operation 6, the calling terminal device 2 receives the answer SDP object, and the calling terminal device 2 starts to collect Internet connection candidate information, as shown in FIG. 2.

At operation 7, the calling terminal device 2 determines whether the public network IP address of the calling terminal device is the same as the public network IP address of the called terminal device 6. In response to determining that the public network IP address of the calling terminal device 2 is different from the public network IP address of the called terminal device 6, operation 8 is performed; or in response to determining that the public network IP address of the calling terminal device is the same as the public network IP address of the called terminal device, step 9 is performed.

At operation 8, the calling terminal device 2 collects information related to Internet connection candidate except information related to a host type of Internet connectivity establishment candidate. Operation 10 is performed.

At operation 9, the calling terminal device 2 collects information related to all types of Internet connection candidate. Operation 10 is performed.

At operation 10, the calling terminal device 2 sends the collected Internet connection candidate information to the signaling server 4, the signaling server 4 forwards the collected Internet connection candidate information to the called terminal device 6.

It should be noted that the called terminal device 6 performs the operations 7 to 10 in a mirroring manner, and sends Internet connection candidate information collected by the called terminal device to the signaling server 4 for the signaling server 4 to forward the collected Internet connection candidate information to the calling terminal device 2.

Finally, the calling terminal device 2 and the called terminal device 6 exchange the Internet connection candidate information with each other, and select a manner to establish the WebRTC connection. The calling terminal device 2 and the called terminal device 6 may implement communication based on the WebRTC connection.

As described above, when the public network IP address of the calling terminal device 2 is different from the public network IP address of the called terminal device 6, the information related to the host type Internet connectivity establishment candidate is excluded from the Internet connectivity establishment candidate information sent by both parties to each other. Therefore, each time a WebRTC connection is established between the terminal devices, the network bandwidth and performance consumption of the signaling server is reduced by over 30%, without affecting the success rate of establishment of the WebRTC connection between the two terminal devices.

Embodiment 2

For technical details about a WebRTC communication method provided in this embodiment, refer to the above.

FIG. 3 is a flowchart schematically showing the WebRTC communication method according to Embodiment 2 of the present application. In an exemplary embodiment, the WebRTC communication method may be performed in the calling terminal device 2 or the called terminal device 6.

As shown in FIG. 3, the WebRTC communication method may include steps S300 to S304.

In step S300, first device information of the calling terminal device and second device information of the called terminal device are obtained.

In step S302, whether there is nonessential information for connection establishment is determined based on the first device information and the second device information.

In step S304, if there is the nonessential information, a WebRTC connection is established between the calling terminal device and the called terminal device with the nonessential information being excluded, so as to implement communication between the calling terminal device and the called terminal device.

The WebRTC communication method provided in this embodiment of the present application has the following advantages. The calling terminal device 2 and the called terminal device 6 need to exchange, by using the signaling server as an intermediate medium, information for establishing the WebRTC connection. In some scenarios, some connection manners are not suitable for the calling terminal device 2 and the called terminal device 6, so that corresponding information may also be considered as nonessential information. Each time a WebRTC connection is established between terminal devices, if both parties ignore such nonessential information (that is, do not use the nonessential information for information exchange), a network bandwidth and performance consumption of the signaling server can be reduced by over 30%, without affecting a success rate of establishment of the WebRTC connection between the two terminal devices.

In an exemplary embodiment, the first device information includes a first public network IP address of the calling terminal device, and the second device information includes a second public network IP address of the called terminal device. As shown in FIG. 4, step S302 may include the following steps. In step S400, whether the first public network IP address is the same as the second public network IP address is determined. In step S402, if the first public network IP address is different from the second public network IP address, Internet connection candidate information of a host type is determined as the nonessential information. In this embodiment, the Internet connection candidate information of the host type is determined as the nonessential information, so that a network bandwidth and performance consumption of the signaling server caused by sending by both parties can be effectively reduced.

In an exemplary embodiment, the Internet connection candidate information of the host type and Internet connection candidate information of another type form Internet connection candidate information. As shown in FIG. 5, step S304 may include the following step. In step S500, the WebRTC connection is established between the calling terminal device and the called terminal device by using the Internet connection candidate information of the another type. In this embodiment, the Internet connection candidate information of a non-host type is used for WebRTC connection, so that the network bandwidth and performance consumption of the signaling server caused by sending by both parties can be effectively reduced.

Figure 6:
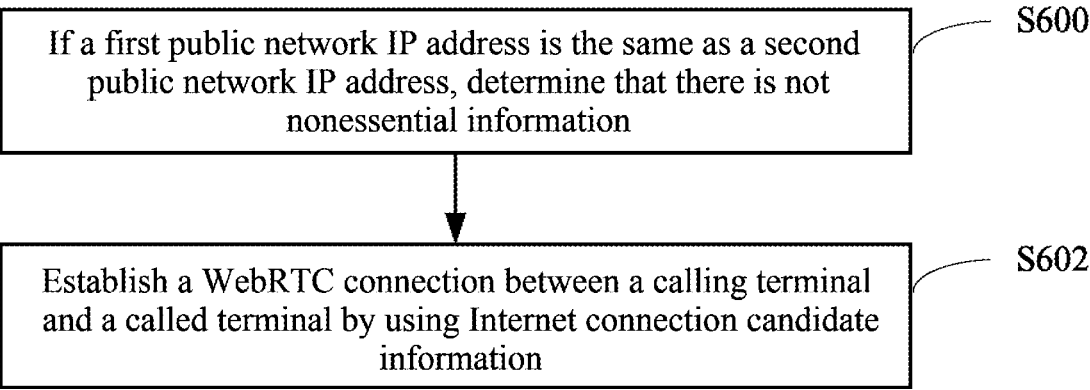
FIG. 6 is a flowchart schematically showing newly added steps of the WebRTC communication method according to Embodiment 2 of the present application.

In an exemplary embodiment, the Internet connection candidate information of the host type and Internet connection candidate information of another type form Internet connection candidate information. As shown in FIG. 6, the method may further include the following steps. In step S600, if the first public network IP address is the same as the second public network IP address, it is determined that there is not the nonessential information. In step S602, the WebRTC connection is established between the calling terminal device and the called terminal device by using the Internet connection candidate information. In this embodiment, Internet connection candidate information of all types is used for WebRTC connection, so that the WebRTC connection between the calling terminal device and the called terminal device is effectively ensured.

Embodiment 3

Figure 7:
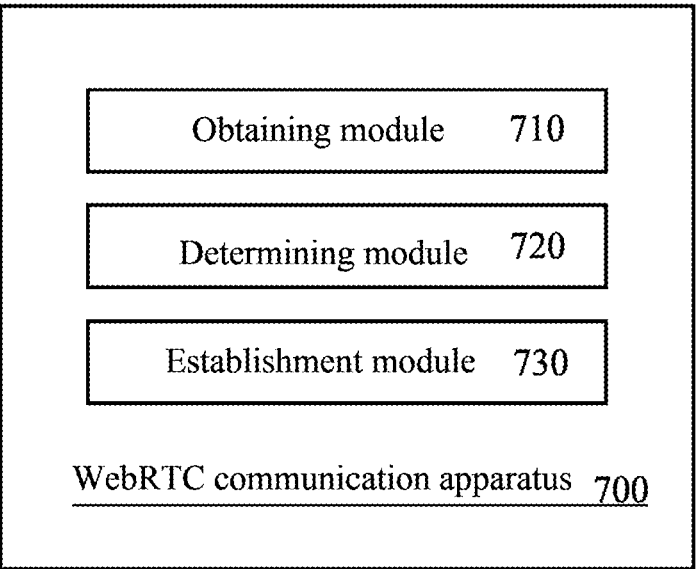
FIG. 7 is a block diagram schematically showing a WebRTC communication apparatus according to Embodiment 3 of the present application.

FIG. 7 is a block diagram schematically showing a WebRTC communication apparatus according to Embodiment 3 of the present application. The WebRTC communication apparatus may be divided into one or more program modules, and the one or more program modules are stored in a storage medium and executed by one or more processors, to implement the embodiments of the present application. The program modules referred to in the embodiments of the present application refer to a series of computer-readable instruction segments capable of implementing a specific function. The functions of various program modules in the embodiments will be specifically described in the following descriptions.

As shown in FIG. 7, the WebRTC communication apparatus 700 may include an obtaining module 710, a determining module 720, and an establishment module 730.

The obtaining module 710 is configured to obtain first device information of a calling terminal device and second device information of a called terminal device;

the determining module 720 is configured to determine, based on the first device information and the second device information, whether there is nonessential information for connection establishment; and the establishment module 730 is configured to: if there is the nonessential information, establish a WebRTC connection between the calling terminal device and the called terminal device with the nonessential information being excluded, so as to implement communication between the calling terminal device and the called terminal device.

In an exemplary embodiment, the first device information includes a first public network IP address of the calling terminal device, and the second device information includes a second public network IP address of the called terminal device. The determining module 720 is further configured to:

determine whether the first public network IP address is the same as the second public network IP address; and if the first public network IP address is different from the second public network IP address, determine Internet connection candidate information of a host type as the nonessential information.

In an exemplary embodiment, the Internet connection candidate information of the host type and Internet connection candidate information of another type form Internet connection candidate information. The establishment module 730 is further configured to: establish the WebRTC connection between the calling terminal device and the called terminal device by using the Internet connection candidate information of the another type.

In an exemplary embodiment, the Internet connection candidate information of the host type and Internet connection candidate information of another type form Internet connection candidate information. The establishment module 730 is further configured to: if the first public network IP address is the same as the second public network IP address, determine that there is not the nonessential information; and establish the WebRTC connection between the calling terminal device and the called terminal device by using the Internet connection candidate information.

Embodiment 4

Figure 8:
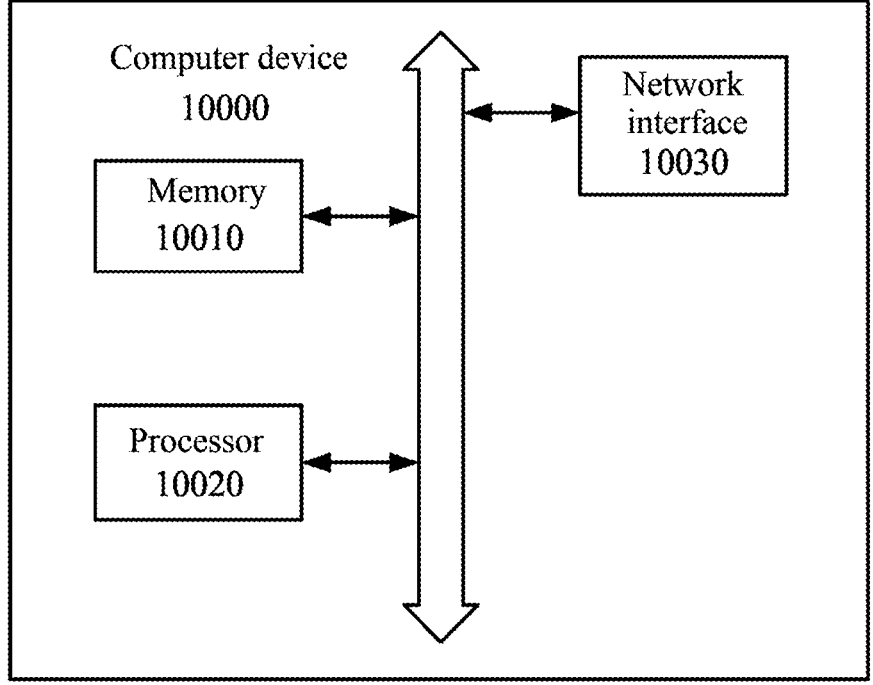
FIG. 8 is a schematic diagram schematically showing a hardware architecture of a computer device suitable for implementing a WebRTC communication method according to Embodiment 4 of the present application.

FIG. 8 is a schematic diagram schematically showing a hardware architecture of a computer device 10000 suitable for implementing a WebRTC communication method according to Embodiment 4 of the present application. In this embodiment, the computer device 10000 may be a device capable of automatically performing numerical calculation and/or information processing according to preset or prestored instructions. For example, the computer device may be various terminal device devices such as a mobile device, a tablet device, a laptop computer, a smart television, a personal computer (PC), or a virtual reality device. As shown in FIG. 8, the computer device 10000 includes, but is not limited to a memory 10010, a processor 10020, and a network interface 10030 that may be communicatively linked to each other through a system bus.

The memory 10010 includes at least one type of computer-readable storage medium. The readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 10010 may be an internal storage module of the computer device 10000, for example, a hard disk or an internal memory of the computer device 10000. In some other embodiments, the memory 10010 may alternatively be an external storage device of the computer device 10000, for example, a plug-in hard disk, a smart media card (SMC for short), a secure digital (SD for short) card, or a flash card on the computer device 10000. Certainly, the memory 10010 may alternatively include both an internal storage module and an external storage device of the computer device 10000. In this embodiment, the memory 10010 is generally configured to store an operating system and various types of application software installed on the computer device 10000, such as program code for the WebRTC communication method. In addition, the memory 10010 may be further configured to temporarily store various types of data that have been output or are to be output.

In some embodiments, the processor 10020 may be a central processing unit (CPU for short), a controller, a microcontroller, a microprocessor, or another data processing chip. The processor 10020 is generally configured to control overall operation of the computer device 10000, for example, execute control, processing, and the like related to data interaction or communication with the computer device 10000. In this embodiment, the processor 10020 is configured to run program code stored in the memory 10010 or to process data.

The network interface 10030 may include a wireless network interface or a wired network interface. The network interface 10030 is generally configured to establish a communication link between the computer device 10000 and another computer device. For example, the network interface 10030 is configured to connect the computer device 10000 to an external terminal device through a network, and establish a data transmission channel, a communication link, and the like between the computer device 10000 and the external terminal device. The network may be a wireless or wired network, for example, Intranet, Internet, the Global System for Mobile Communications (GSM for short), wideband code division multiple access (WCDMA for short), a 4G network, a 5G network, Bluetooth, or Wi-Fi.

It should be noted that FIG. 8 shows only a computer device having components 10010 to 10030. However, it should be understood that not all of the shown components are required to be implemented, and more or fewer components may be implemented instead.

In this embodiment, the WebRTC communication method stored in the memory 10010 may alternatively be divided into one or more program modules and executed by one or more processors (the processor 10020 in this embodiment) to implement the embodiments of the present application.

Embodiment 5

The present application further provides a computer-readable storage medium having computer-readable instructions stored thereon. When the computer-readable instructions are executed by a processor, the following steps are implemented:

obtaining first device information of a calling terminal device and second device information of a called terminal device;

determining, based on the first device information and the second device information, whether there is nonessential information for connection establishment; and if there is the nonessential information, establishing a WebRTC connection between the calling terminal device and the called terminal device with the nonessential information being excluded, so as to implement communication between the calling terminal device and the called terminal device.

In this embodiment, the computer-readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EE-PROM), a programmable read-only memory (PROM), a magnetic memory, a magnetic disk, an optical disc, and the like. In some embodiments, the computer-readable storage medium may be an internal storage unit of a computer device, for example, a hard disk or an internal memory of the computer device. In some other embodiments, the computer-readable storage medium may alternatively be an external storage device of a computer device, for example, a plug-in hard disk, a smart media card (SMC for short), a secure digital (SD for short) card, or a flash card on the computer device. Certainly, the computer-readable storage medium may alternatively include both an internal storage unit and an external storage device of a computer device. In this embodiment, the computer-readable storage medium is generally configured to store an operating system and various types of application software installed on the computer device, for example, program code for a WebRTC communication method in the embodiments. In addition, the computer-readable storage medium may be further configured to temporarily store various types of data that have been output or are to be output.

It is clear to those skilled in the art that the various modules or steps in the above embodiments of the present application may be implemented by a general-purpose computing apparatus, and may be centralized on a single computing apparatus or distributed on a network formed by a plurality of computing apparatuses. Optionally, the various modules or steps may be implemented by using program code executable by the computing apparatus, such that they may be stored in a storage apparatus and executed by the computing apparatus, and in some cases, the steps shown or described may be performed in a sequence different from that described herein, or they may be respectively fabricated into various integrated circuit modules, or a plurality of modules or steps thereof may be implemented as a single integrated circuit module. In this way, the embodiments of the present application are not limited to any specific combination of hardware and software.

It should be noted that the foregoing descriptions are merely preferred embodiments of the present application, and are not intended to limit the patent protection scope of the present application. Any transformation of equivalent structures or equivalent processes that is made using the contents of the description and accompanying drawings of the present application, or any direct or indirect application thereof in other related technical fields shall equally fall within the patent protection scope of the present application.

What is claimed is:

1. A method of implementing Web real-time communications (WebRTC), comprising:
acquiring first device information of a calling terminal device and second device information of a called terminal device;
determining, based on the first device information and the second device information, whether there is nonessential information with respect to establishing a WebRTC connection between the calling terminal device and the called terminal device;

in response to determining that there is the nonessential information, excluding the nonessential information from being collected and transmitted by the calling terminal device and the called terminal device to a signaling server, wherein the nonessential information comprises Internet connectivity establishment (ICE) candidates of a host type;
establishing the WebRTC connection between the calling terminal device and the called terminal device with the nonessential information being excluded, wherein the establishing the WebRTC connection between the calling terminal device and the called terminal device with the nonessential information being excluded comprises establishing the WebRTC connection using ICE candidates of a non-host type; and
implementing WebRTC communications between the calling terminal device and the called terminal device.

2. The method according to claim 1,
wherein the first device information comprises a first public network IP address of the calling terminal device, and the second device information comprises a second public network IP address of the called terminal device; and
wherein the determining, based on the first device information and the second device information, whether there is nonessential information with respect to establishing a WebRTC connection between the calling terminal device and the called terminal device further comprises:
determining whether the first public network IP address is the same as the second public network IP address, and
determining information related to a host type of Internet connectivity establishment (ICE) candidate as the nonessential information in response to determining that the first public network IP address is different from the second public network IP address.

3. The method according to claim 1, wherein Internet connectivity establishment (ICE) candidates comprise a host type of ICE candidate and a non-host type of ICE candidate, and wherein the establishing the WebRTC connections between the calling terminal device and the called terminal device with the nonessential information being excluded further comprises:
establishing the WebRTC connection between the calling terminal device and the called terminal device using information related to the non-host type of ICE candidate in response to determining that a first public network IP address of the calling terminal device is different from a second public network IP address of the called terminal device.

4. The method according to claim 1, wherein Internet connectivity establishment (ICE) candidates comprise a host type of ICE candidate and a non-host type of ICE candidate, and wherein the method further comprises:
in response to determining that the first public network IP address is the same as the second public network IP address, establishing the WebRTC connection between the calling terminal device and the called terminal device using information related to the ICE candidates.

5. A computer device, comprising a memory and a processor, wherein computer-readable instructions are stored on the memory and executable by the processor, and wherein the computer-readable instructions, when executed by the processor, cause the processor to implement operations comprising:

acquiring first device information of a calling terminal device and second device information of a called terminal device;

determining, based on the first device information and the second device information, whether there is nonessential information with respect to establishing a Web real-time communications (WebRTC) connection between the calling terminal device and the called terminal device;

in response to determining that there is the nonessential information, excluding the nonessential information from being collected and transmitted by the calling terminal device and the called terminal device to a signaling server, wherein the nonessential information comprises Internet connectivity establishment (ICE) candidates of a host type;

establishing the WebRTC connection between the calling terminal device and the called terminal device with the nonessential information being excluded, wherein the establishing the WebRTC connection between the calling terminal device and the called terminal device with the nonessential information being excluded comprises establishing the WebRTC connection using ICE candidates of a non-host type; and implementing WebRTC communications between the calling terminal device and the called terminal device.

6. The computer device according to claim 5, wherein the first device information comprises a first public network IP address of the calling terminal device, and the second device information comprises a second public network IP address of the called terminal device; and wherein the determining, based on the first device information and the second device information, whether there is nonessential information with respect to establishing a WebRTC connection between the calling terminal device and the called terminal device further comprises:

determining whether the first public network IP address is the same as the second public network IP address, and determining information related to a host type of Internet connectivity establishment (ICE) candidate as the nonessential information in response to determining that the first public network IP address is different from the second public network IP address.

7. The computer device according to claim 5, wherein Internet connectivity establishment (ICE) candidates comprise a host type of ICE candidate and a non-host type of ICE candidate, and wherein the establishing the WebRTC connections between the calling terminal device and the called terminal device with the nonessential information being excluded further comprises:

establishing the WebRTC connection between the calling terminal device and the called terminal device using information related to the non-host type of ICE candidate in response to determining that a first public network IP address of the calling terminal device is different from a second public network IP address of the called terminal device.

8. The computer device according to claim 5, wherein Internet connectivity establishment (ICE) candidates comprise a host type of ICE candidate and a non-host type of ICE candidate, and wherein the operations further comprise:

in response to determining that the first public network IP address is the same as the second public network IP address, establishing the WebRTC connection between the calling terminal device and the called terminal device using information related to the ICE candidates.

9. A non-transitory computer-readable storage medium, storing computer-readable instructions stored thereon, wherein the computer-readable instructions upon execution by at least one processor cause the at least one processor to perform operations comprising:

acquiring first device information of a calling terminal device and second device information of a called terminal device;

determining, based on the first device information and the second device information, whether there is nonessential information with respect to establishing a Web real-time communications (WebRTC) connection between the calling terminal device and the called terminal device;

in response to determining that there is the nonessential information, excluding the nonessential information from being collected and transmitted by the calling terminal device and the called terminal device to a signaling server, wherein the nonessential information comprises Internet connectivity establishment (ICE) candidates of a host type;

establishing the WebRTC connection between the calling terminal device and the called terminal device with the nonessential information being excluded, wherein the establishing the WebRTC connection between the calling terminal device and the called terminal device with the nonessential information being excluded comprises establishing the WebRTC connection using ICE candidates of a non-host type; and implementing WebRTC communications between the calling terminal device and the called terminal device.

10. The non-transitory computer-readable storage medium according to claim 9, wherein the first device information comprises a first public network IP address of the calling terminal device, and the second device information comprises a second public network IP address of the called terminal device; and wherein the determining, based on the first device information and the second device information, whether there is nonessential information with respect to establishing a WebRTC connection between the calling terminal device and the called terminal device further comprises:

determining whether the first public network IP address is the same as the second public network IP address, and determining information related to a host type of Internet connectivity establishment (ICE) candidate as the nonessential information in response to determining that the first public network IP address is different from the second public network IP address.

11. The non-transitory computer-readable storage medium according to claim 9, wherein Internet connectivity establishment (ICE) candidates comprise a host type of ICE candidate and a non-host type of ICE candidate, and wherein the establishing the WebRTC connections between the calling terminal device and the called terminal device with the nonessential information being excluded further comprises:

establishing the WebRTC connection between the calling terminal device and the called terminal device using information related to the non-host type of ICE candidate in response to determining that a first public network IP address of the calling terminal device is different from a second public network IP address of the called terminal device.

12. The non-transitory computer-readable storage medium according to claim 9, wherein Internet connectivity establishment (ICE) candidates comprise a host type of ICE candidate and a non-host type of ICE candidate, and wherein the operations further comprise:

in response to determining that the first public network IP address is the same as the second public network IP address, establishing the WebRTC connection between the calling terminal device and the called terminal device using information related to the ICE candidates.

\* \* \* \* \*